(12) United States Patent
Kawamata

(10) Patent No.: US 11,107,278 B2
(45) Date of Patent: Aug. 31, 2021

(54) POLYGON MODEL GENERATING APPARATUS, POLYGON MODEL GENERATION METHOD, AND PROGRAM

(71) Applicant: SONY INTERACTIVE ENTERTAINMENT INC., Tokyo (JP)

(72) Inventor: Wataru Kawamata, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 89 days.

(21) Appl. No.: 16/494,023

(22) PCT Filed: Mar. 30, 2017

(86) PCT No.: PCT/JP2017/013326
§ 371 (c)(1),
(2) Date: Sep. 13, 2019

(87) PCT Pub. No.: WO2018/179253
PCT Pub. Date: Oct. 4, 2018

(65) Prior Publication Data
US 2020/0027268 A1    Jan. 23, 2020

(51) Int. Cl.
*G06T 17/20* (2006.01)

(52) U.S. Cl.
CPC .................. *G06T 17/20* (2013.01)

(58) Field of Classification Search
CPC .............. G06T 19/00; G06T 17/20
See application file for complete search history.

(56) References Cited

U.S. PATENT DOCUMENTS 8,243,070 B1 * 8/2012 Brown .................... G06T 17/20
345/423
9,710,462 B2 * 7/2017 Sanders .................. G06T 19/00
(Continued)

FOREIGN PATENT DOCUMENTS

JP          2002-222430 A     8/2002
JP          2007-322351 A     12/2007
(Continued)

OTHER PUBLICATIONS

International Search Report and Written Opinion dated May 16, 2017, from International Application No. PCT/JP2017/013326, 9 sheets.
(Continued)

*Primary Examiner* — Yu Chen
(74) *Attorney, Agent, or Firm* — Katten Muchin Rosenman LLP

(57) ABSTRACT

A polygon model generating apparatus, a polygon model generation method, and a program each capable of highly precisely generate a polygon model whose surface is set along the contour of a group of points, are provided. An initial polygon model generating part (72) generates a polygon model that includes plural polygons on the basis of point group data indicating the group of points in a virtual space. An intersectional polygon deleting part (82) identifies an intersectional polygon that is the polygon intersecting with a line whose both ends are a first position to view therefrom the polygon model in a virtual space and a second position that is the position of a point belonging to the group of points. An intersectional polygon deleting part (82) deletes the intersectional polygon from the polygon model.

7 Claims, 13 Drawing Sheets

(56) References Cited

U.S. PATENT DOCUMENTS

| | | | | |
|---|---|---|---|---|
| 10,469,829 B2* | 11/2019 | Ohba | ............... | H04N 13/128 |
| 2008/0088626 A1* | 4/2008 | Habe | ............... | G06T 17/20 |
| | | | | 345/427 |
| 2009/0303235 A1* | 12/2009 | Maekawa | ............ | G06T 17/205 |
| | | | | 345/423 |
| 2011/0279475 A1* | 11/2011 | Ikenoue | ............. | G06T 7/277 |
| | | | | 345/619 |
| 2013/0113802 A1* | 5/2013 | Weersink | ............. | G06T 15/20 |
| | | | | 345/427 |
| 2015/0123973 A1* | 5/2015 | Larsen | ............... | G06T 17/20 |
| | | | | 345/427 |
| 2015/0363665 A1 | 12/2015 | Szasz | | |
| 2018/0144534 A1* | 5/2018 | Lee | ............... | G06K 9/6218 |

FOREIGN PATENT DOCUMENTS

| | | |
|---|---|---|
| JP | 2012-146262 A | 8/2012 |
| WO | 2015/193708 | 12/2015 |

OTHER PUBLICATIONS

Suharu Nishitani et al., "Representing a 3D Scene from Selected Optimum Textures by using a Multi-view Stereo", IPSJ SIG Notes Computer Vision and Image Media (CVIM) 2013-CVIM-187, May 23, 2013 (May 23, 2013), pp. 1 to 8, particularly, p. 4, 9 sheets.

International Preliminary Report on Patentability dated Oct. 1, 2019, from International Application No. PCT/JP2017/013326, 14 sheets.

Decision to Grant a Patent dated Apr. 7, 2020, from Japanese Application No. 2019-508036, 3 sheets.

\* cited by examiner

| POINT ID | COORDINATE DATA |
|---|---|
| 1 | (x,y,z) |

FIG.6
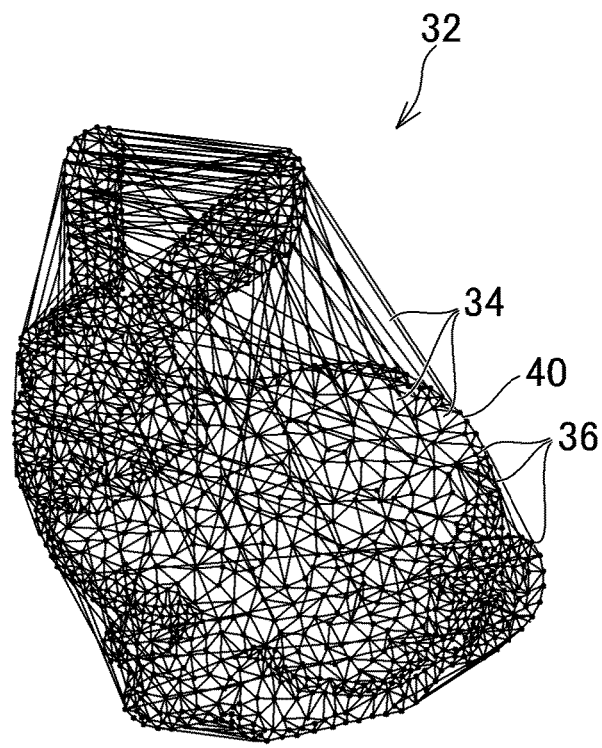
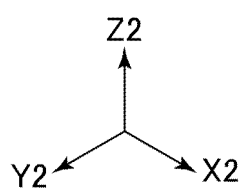
FIG.7
| POLYGON ID | VERTEX DATA |
|---|---|
| 1 | 1,2,3 |

POLYGON MODEL GENERATING APPARATUS, POLYGON MODEL GENERATION METHOD, AND PROGRAM

TECHNICAL FIELD

The present invention relates to a polygon model generating apparatus, a polygon model generation method, and a program.

BACKGROUND ART

A technique of generating a polygon model positioned along a contour of a group of points is present. As an example of this technique, PTL 1 describes a technique of generating a polygon model arranged in a virtual space from an image that includes depth information obtained by shooting an object arranged in the real space.

With this technique, an initial sculpture including triangular polygons is first generated in the virtual space. A point in the virtual space (a data point) correlated with a combination of each of the pixels in the obtained image and a depth of the pixel is thereafter identified. Ray-casting is thereafter executed from the origin to the identified data point and an intersection of the ray-casted ray and the polygon is identified. A vertex of the polygon is thereafter moved in accordance with a length between the identified intersection and the data point and the initial sculpture is thereby deformed.

CITATION LIST

Patent Literature

[PTL 1]
PCT Patent Publication No. WO2015/193708

SUMMARY

Technical Problem

The inventors discuss a new approach of generating a polygon model set along a contour of a group or points. With this approach, point group data it a group of points in a virtual space is first generated from an image including depth information, and the like. Delaunay triangulation (tetrahedralization) using, for example, a point belonging to the group of points as the Delaunay point, or the like is thereafter executed and thereby a polygon model including plural polygons whose vertexes are each a point belonging to the group of points.

The polygon model generated as above is however not a polygon model whose outer surface is set along the contour of the group of points. Concerning this, it can be considered that the polygon model can be set to be closer to the polygon model whose outer surface is set along the contour of the group of points by, for example, deleting the polygons each including a side that is longer than a predetermined length, from the polygon model. Even when this deletion is executed, however, any sufficiently precise polygon model whose contour is set along the contour of the group of points may not be obtained due to an influence of the uneven density of the group of points, and the like.

The present invention was conceived in view of the above problem and an object thereof is to provide a polygon model generating apparatus, a polygon model generation method, and a program that each can highly precisely generate a polygon model that is set along the contour of a group of points.

Solution to Problem

To solve the above problem, the polygon model generating apparatus according to the present invention includes a polygon model generating part that generates a polygon model including plural polygons on the basis of point group data that indicates a group of points in a virtual space, an intersectional polygon identifying part that identifies an intersectional polygon that is the polygon intersecting with a line whose both ends are a first position to view therefrom the polygon model in the virtual space and a second position that is the position of a point belonging to the group of points, and an intersectional polygon deleting part that deletes the intersectional polygon from the polygon model.

An aspect of the present invention further includes an image obtaining part that obtains an image obtained by shooting an object to be shot by a real camera in a real space, a point group data generating part that generates the point group data for which the points belonging thereto each correspond to a point on the object to be shot in the real space, on the basis of the image, and a corresponding camera position identifying part that identifies the position in the virtual space corresponding to the position in the real space, of the real camera at a time when the object to be shot is shot. The intersectional polygon identifying part identifies the intersectional polygon using the position identified in accordance with the corresponding camera position identification procedure, as the first position.

Moreover, an aspect of the present invention further includes an invisible polygon identifying part that identifies an invisible polygon that is the polygon invisible by any of one or plural virtual cameras set in the virtual space, and an invisible polygon deleting part that deletes the invisible polygon from the polygon model.

Moreover, an aspect of the present invention further includes a point density value, determining part that determines the value of the point density correlated with a point belonging to the group of points on the basis of a distribution of the group of points, and a long-side polygon deleting part that, in the case where the length of a side constituting the polygon exceeds a threshold value in accordance with the value of the point density correlated with an end point of the side, deletes the polygon from the polygon model.

In this aspect, for only each of at least some of the points whose values of the point density correlated thereto are each greater than a predetermined value, the intersectional polygon identifying part may identify the intersectional polygon using the position of the point as the second position.

Moreover, a polygon model generation method according to the present invention includes a polygon model generation step of generating a polygon model that includes plural polygons on the basis of point group data indicating a group of points in a virtual space, an intersectional polygon identification step of identifying an intersectional polygon that is the polygon intersecting with a line whose both ends are a first position to view therefrom the polygon model in the virtual space and a second position that is the position of a point belonging to the group of points, and an intersectional polygon deletion step of deleting the intersectional polygon from the polygon model.

Moreover, a program according to the present invention causes a computer to execute a polygon model generation procedure of generating a polygon model that includes plural polygons on the basis of point group data indicating a group of points in a virtual space, an intersectional polygon identification procedure of identifying an intersectional polygon that is the polygon intersecting with a line whose both ends are a first position to view therefrom the polygon model in the virtual space and a second position that is the position of a point belonging to the group of points, and an intersectional polygon deletion procedure of deleting the intersectional polygon from the polygon model.

BRIEF DESCRIPTION OF DRAWINGS

FIG. 6 is a diagram schematically depicting an example of the state where an initial polygon model is arranged in the virtual space.

FIG. 7 is a diagram depicting an example of polygon data.

DESCRIPTION OF EMBODIMENT

An embodiment of the present invention will be described below in detail with reference to the drawings.

Figure 1:
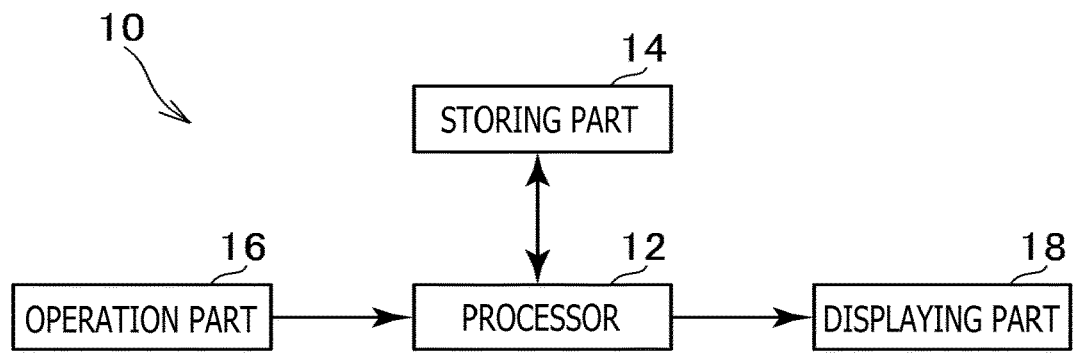
FIG. 1 is a configuration diagram of a polygon model generating apparatus according to an embodiment of the present invention.

FIG. 1 is a configuration diagram of a polygon model generating apparatus 10 according to an embodiment of the present invention. The polygon model generating apparatus 10 according to the present embodiment is a computer such as, for example, a game console or a personal computer. As depicted in FIG. 1, the polygon model generating apparatus 10 according to the present embodiment includes, for example, a processor 12, a storing part 14, an operation part 16, and a displaying part 18.

The processor 12 is a program control device such as, for example, a central processing unit (CPU) that operates in accordance with programs installed in the polygon model generating apparatus 10. The processor 12 according to the present embodiment also includes a graphics processing unit (GPU) that draws an image in a frame buffer on the basis of a graphics command and data supplied from the CPU.

The storing part 14 is a storage element such as a read-only memory (ROM) or a random access memory (RAM), or a hard disc drive. The storing part 14 stores therein programs to be executed by the processor 12, and the like. Moreover, the storing part 11 according to the present embodiment has an area for the frame buffer secured therein in which the image is drawn by the GPU.

The operation part 16 is a user interface such as a keyboard, a mouse, a controller of a game console, accepts an operational input by the user, and outputs a signal indicating the content of the operational input to the processor 12.

The displaying part 18 is a displaying device such as a liquid crystal display and displays thereon various types of image in accordance with the instruction of the processor 12.

In addition, the polygon model generating apparatus 10 may include a communication interface such as a network board, an optical disc drive that reads optical discs such as a digital versatile disc (DVD)-ROM and a Blu-ray (registered trademark) disc, a universal serial bus (USB) port, and the like.

Figure 2:
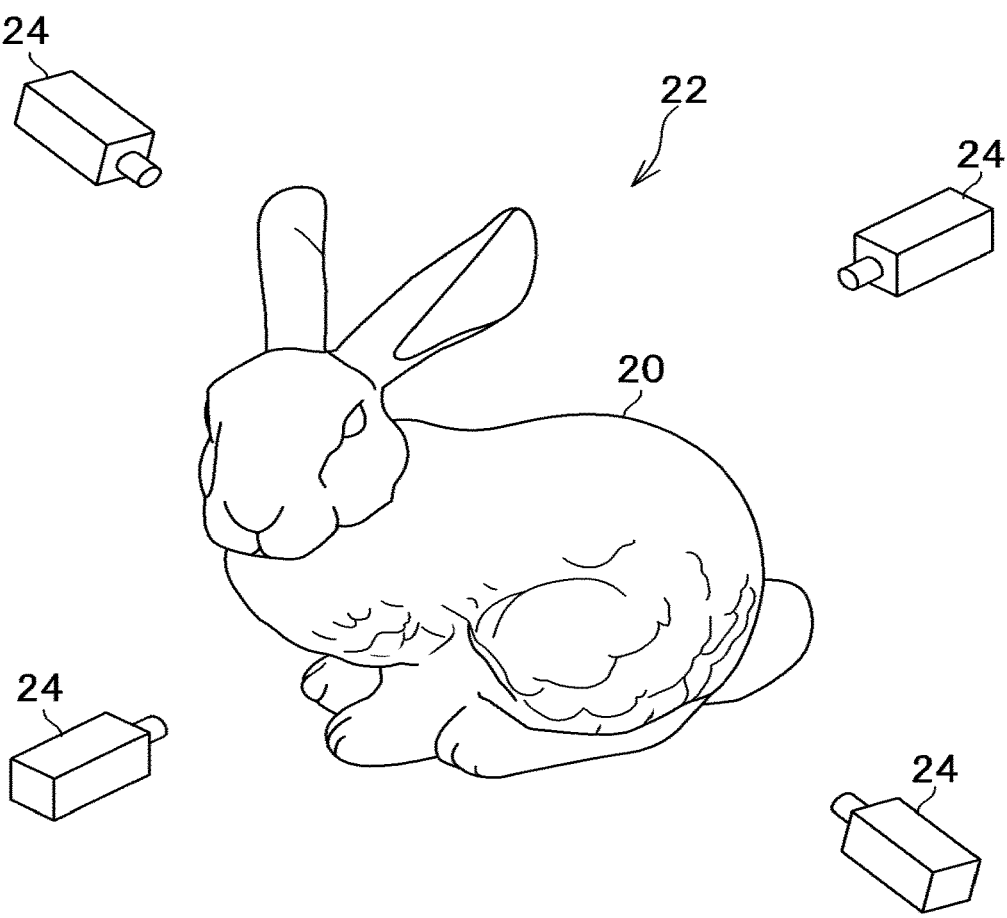
FIG. 2 is a diagram schematically depicting an example of the state where an object to be shot is arranged in a real space.
Figure 2:
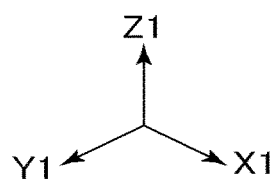

FIG. 2 is a diagram schematically depicting an example of the state where an object 20 to be shot is arranged in a real space 22 according to the present embodiment. FIG. 2 depicts a real object having a shape like that of Stanford Sunny as an example of the object 20 to be shot.

Figure 3:
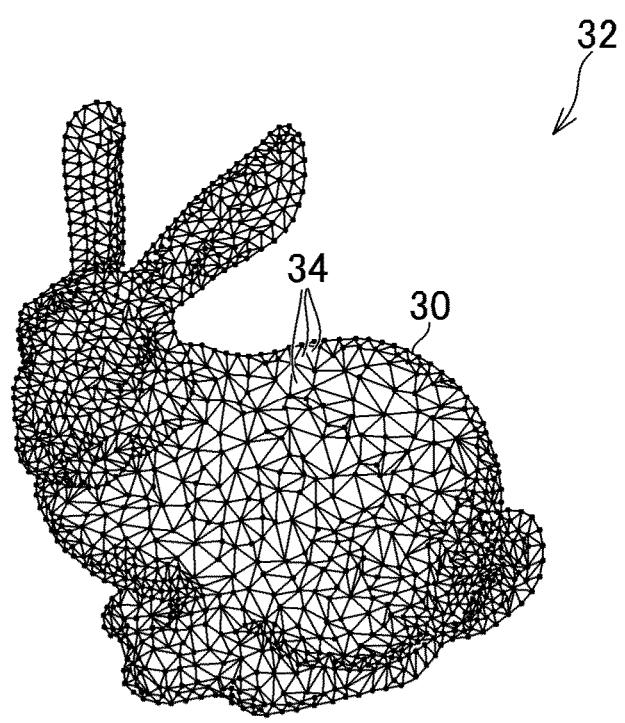
FIG. 3 is a diagram, schematically depicting an example of the state where a polygon model copying the object to be shot is arranged in a virtual space.
Figure 3:
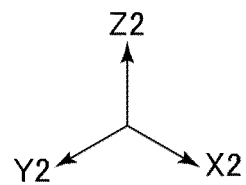

FIG. 3 as a diagram schematically depicting an example of the state where a polygon model copying the object 20 to be shot is arranged in a virtual space 32. In the polygon model generating apparatus 10 according to the present embodiment, the polygon model depicted in FIG. 3 is finally generated on the basis of, for example, one or plural shot images each obtained by shooting the object 20 to be shot that is exemplified in FIG. 2 by a real camera 24 arranged in the real space 22. The finally generated polygon model will hereinafter be referred to as "final polygon model 30."

The final polygon model 30 depicted in FIG. 3 is constituted by plural polygons 34. The virtual space 32 according to the present embodiment is a space formed by modeling the real space 22. In the present embodiment, the position and the orientation of the object 20 to be shot in the real space 22 are reflected on the position and the orientation of the final polygon model 30 in the virtual space 32. Hereinafter, the position in the real space 22 will be represented using an X1-Y1-Z1 coordinate system and the position in the virtual space 32 will be represented using an X2-Y2-Z2 coordinate system.

A generation process for the final polygon model 30 on the basis of the object 20 to be shot and executed by the polygon model generating apparatus 10 will be described below.

The polygon model generating apparatus 10 according to the present embodiment first obtains one or plural shot images obtained by shooting the object 20 to be shot by the real camera 24. In addition, the shot images may simultaneously be shot by the plural real cameras 24 or the shot images of the object 20 to be shot may be shot from various directions by one real camera 24. The real camera 24 may be a camera capable of shooting a shot image that includes the depth information such as a stereo camera or a camera with an infrared ray distance sensor. In this case, for example, a depth image that shows the distribution of the distance from the real camera 24 to the object 20 to be shot, that is correlated with each of the pixels included in the shot image, may be generated together with the shot image by the real camera 24.

Figures 4, 5:
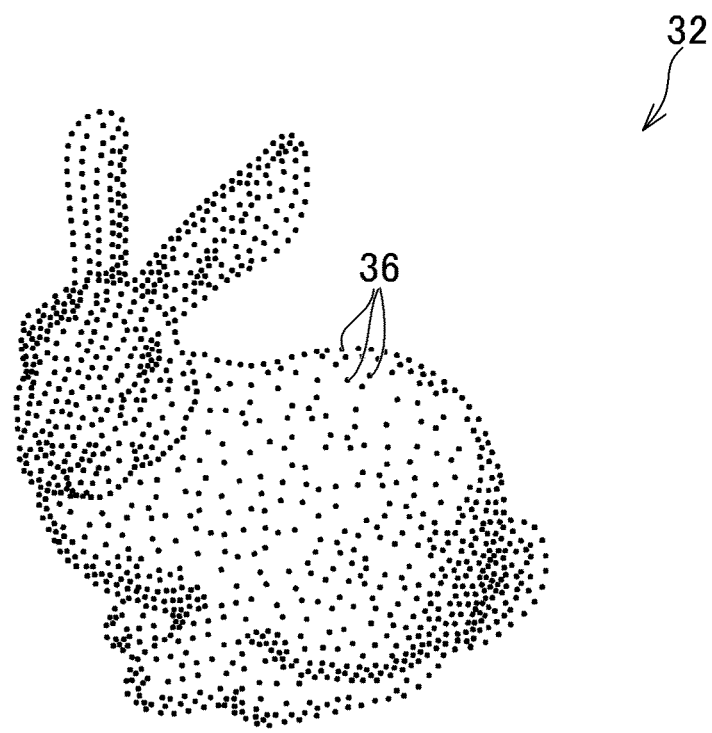
FIG. 4 is a diagram schematically depicting an example of plural points that belong to ca group of points indicated by point group data.
FIG. 5 is a diagram depicting an example of point data.

FIG. 4 is a diagram schematically depicting an example of plural points 36 that belong to the group of points indicated by the point group data generated on the basis of the one or plural shot images. In the present embodiment, the point group data indicating the group of points to which the plural points 36 in the virtual space 32 belong, is generated using a known approach on the basis of the one or plural shot images obtained by the polygon model generating apparatus 10. Moreover, the point group data may be generated on the basis of the shot images and the depth image.

In the present embodiment, in the case where the plural shot images are shot, unevenness may be generated in the density of the points 36 belonging to the group of points due to the difference in the distance between the object 20 to be shot and the real camera 24 and the difference in the resolution among the plural real cameras 24 that shoot the shot images for the time when the shot images are shot. Moreover, unevenness may be generated in the density of the points 36 belonging to the group of points also due to the orientation of the object 20 to be shot to the real cameras 24.

FIG. 5 is a diagram depicting an example of the point data included in the point group data and correlated with one of the points 36. The point data depicted in FIG. 5 includes a combination of a point identification (ID) that is identification information of the point 36 correlated with the point data, and coordinate data that indicates the three-dimensional coordinate values representing the position of the point 36 represented in the X2-Y2-Z2 coordinate system. The point group data generated in the present embodiment includes pieces of the point data exemplified in FIG. 5 for the number corresponding to the number of the points 36 belonging to the group of points.

The positions of the points 36 depicted in FIG. 4 are thereafter correlated with the positions of the points on the surface of the object 20 to be shot that are identified on the basis of the one or the plural shot images. In the present embodiment, for example, the coordinate values (x1, y1, z1) in the X1-Y1-Z1 coordinate system in the real space 22 are thereafter mapped to the coordinate values (t·x1, t·y1, t·z1) (t is a constant) in the X2-Y2-Z2 coordinate system in the virtual space 32. In the embodiment, the shape of a three-dimensional body whose surface is set along the contour of the group of points depicted in FIG. 4 is therefore substantially same as the shape of the object 20 to be shot depicted in FIG. 2.

The polygon model generating apparatus 10 according to the present embodiment thereafter generates polygon model data that indicates the polygon model constituted by the plural polygon on the of the points 36 belonging to the group of points depicted in FIG. 4. In this case, it is assumed, for example, that the polygon model data is generated that indicates the polygon model exemplified in FIG. 6 constituted by the polygons 34 vertexes are the points 36 belonging to the group of points depicted in FIG. 4. In addition, some of the points 36 belonging to the group of points may not each be any vertex of the polygons 34 but may each be a point on the face of any one of the polygons 34. The polygon model depicted in FIG. 6 will hereinafter be referred to as "initial polygon model 40." The initial polygon model 40 constituted by plural triangles may be generated by executing Delaunay triangulation (tetrahedralization) using, for example, the point 36 belonging to the group of points depicted in FIG. 4 as the Delaunay point. In addition, the initial polygon model 40 does not need to be generated by the Delaunay triangulation and no problem arises when the initial polygon model 40 is generated using another method.

FIG. 7 is a diagram depicting an example of the polygon data that is correlated with one of the polygons 34. In the present embodiment, the polygon model data is generated that includes the pieces of polygon data for the number corresponding to the number of the polygons 34 included in the initial polygon model 40. The polygon data includes, for example, a polygon ID that is the distinguishing information for the polygon 34 correlated with the polygon data and vertex data that is a list with order of the point IDs of the points 36 that are the vertex of the polygon 34.

Moreover, a normal line direction (the front and the back) of the polygon 34 correlated with the polygon data by the polygon data may be defined. For example, this is the order of the vertexes to be the counterclockwise direction when the polygon 34 is seen from its front side. The list with order of the points 36 respectively correlated with the vertexes may be included in the polygon data as vertex data. In this case, the direction from the back side of the polygon 34 toward the front side thereof may be defined as the normal line direction.

In addition, the data structure of the polygon data is not limited to the one depicted in FIG. 7.

Concerning the above, the initial polygon model 40 exemplified in FIG. 6 includes a convex hull of the group of points depleted in FIG. 4 and it cannot be stated that the surface thereof is set along the contour of the group of points depicted in FIG. 4. In the present embodiment, the polygons 34 constituting the initial polygon model 40 exemplified in FIG. 6 are sequentially deleted by executing a long-side polygon deletion process, an intersectional polygon deletion process, and an invisible polygon deletion process that will be described below. According to the present embodiment, the initial polygon model 40 exemplified in FIG. 5 is brought close to a polygon model whose surface is set along the contour of the group of points depicted in FIG. 4, that is, a polygon model whose reproduction precision for the object 20 to be shot is high, by executing as above.

Figure 8:
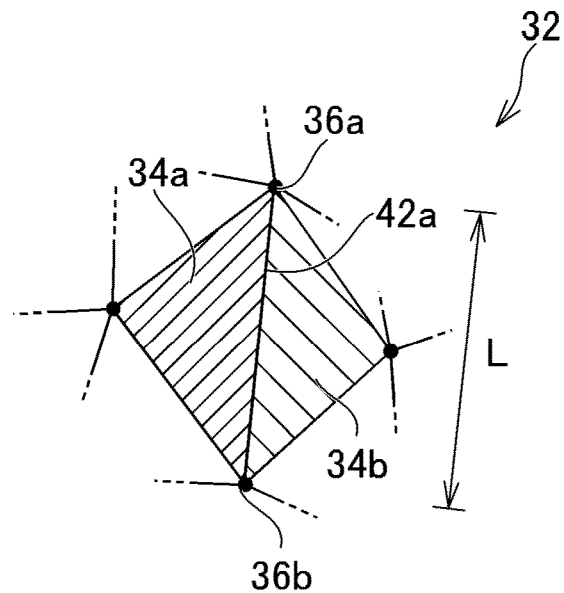
FIG. 8 is an explanatory diagram explaining an example of a long-side polygon deletion process.

Concerning the above, an example of the long-side polygon deletion process will be described with reference to FIG. 8.

In the long-side polygon deletion, process, the value of the point density is first determined that is correlated with each of the points 36 belonging to the group of points, on the basis of the distribution of the group of points depleted in FIG. 4.

Concerning the above, the number of the points 36 included in an octahedron having a predetermined volume and centering the specific point 36 may be determined as the value of the point density that corresponds to the specific point 36.

Moreover, the point group data may include data having an octree data structure that correlates the position of each of the points 36 arranged in the virtual space 32 with one of partial spaces formed by recursively dividing into eight a three-dimensional space occupied by a cube whose surface covers the group of points indicated by the point group data.

In this case, the density of the points 36 roughly identified on the basis of the octree may be determined as the value of the point density correlated with the point 36. The value of the point density is determined at a high speed by executing as above.

In addition, the determination method for the value of the point density is not limited to the above method.

For each of sides 42 included in the initial polygon model 40, a threshold value is next determined that is correlated with the side 42 on the basis of the value of the point density correlated with the point 36 that is an end point of the side 42. In the example in FIG. 8, it is assumed that the value of the point density correlated with a point 36a that is one end point of a side 42a is identified as v1. It is also assumed that the value of the point density correlated with a point 36b that is the other end point of the side 42a is identified as v2. In this case, a threshold value th is determined that is correlated with the side 42a on the basis of, for example, the value v1 and the value v2. Concerning this, for example, a threshold value correlated with a smaller value of the value v1 and the value v2 may be determined to be the threshold value th. Moreover, for example, a threshold value, correlated with as greater value, of the value v1 and the value v2 may also be determined to be the threshold value th. Moreover, for example, a threshold value correlated with the average of the value v1 and the value v2 may also be determined to be the threshold value th.

In addition, it is assumed in the present embodiment that the rule for the correlation between the value of the point density and the threshold value is provided in advance and the threshold value can be determined on the basis of the value of the point density. Moreover, it is also assumed therein that a smaller value is determined as the threshold value to be correlated with the value of the point density as the value of the point density is greater.

The sides 42 for each of which the length of the side 42 is larger than the threshold value that is correlated with the side 42 are thereafter identified from the sides 42 included in the initial polygon model 40. The polygons 34 including the identified sides 42 are thereafter deleted from the initial polygon model 40. In other words, the pieces of polygon data corresponding to the polygons 34 including the identified sides 42 are deleted from the polygon model data. In the example in FIG. 8, in the case where a length L of the side 42a exceeds the threshold value th, a polygon 31a and a polygon 34b each including the side 42a are deleted from the initial polygon model 40.

When the polygons 34 each including the side 42 that is longer than a predetermined length are uniformly deleted from the initial polygon model 40 exemplified in FIG. 6 without executing the long-side polygon deletion process described above, no highly precise polygon model may be obtained due, to the influence, of the unevenness of the density of the group of points depicted in FIG. 4. For example, when the predetermined length described above is reduced, the surface of the polygon model is set along the contour of the group of points even at recessed portions whole the possibility for the polygon model to have holes formed thereon is increased. Moreover, when the predetermined length described above is increased, the possibility for the polygon model to have holes formed thereon is reduced while, the possibility for the surface of the polygon model not to be set along the contour of the group of points in the recessed portions is increased.

In the long-side polygon deletion process according to the present embodiment, the polygons 34 each including a long side are deleted on the basis of a threshold value on with the density of the points 36 belonging to the group of points is reflected. More specifically, for example, in the portion whose, points 36 are dense, even the polygons 34 each including a relatively short side are deleted while, in the portion whose points 36 are sparse, even the polygons 34 each including a relatively long side are not deleted. In this manner, in the present embodiment, a highly precise polygon model can be obtained.

Figure 9:
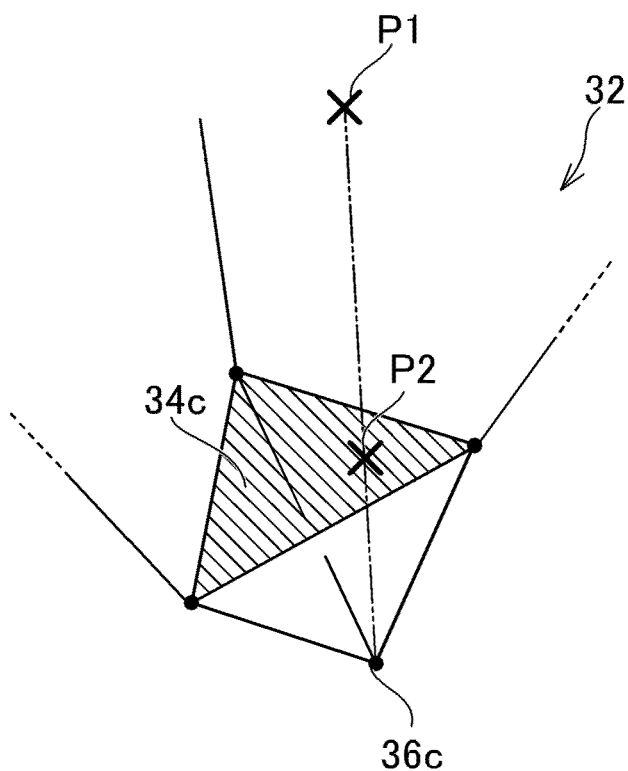
FIG. 9 is an explanatory diagram explaining an example of an intersectional polygon deletion process.

In the present embodiment, the intersectional polygon deletion process described below is thereafter executed to further improve the precision of the polygon model, Concerning the above, an example, of the intersectional polygon deletion process will be, described with reference to FIG. 9.

In the intersectional polygon deletion process, the position in the virtual space 32 is first identified that corresponds to the position of the real camera 24 in the real space 22 for the time when the shot image is shot. In the case where the X1-Y1-Z1 coordinate values of the position of the real camera 24 are (x1, y1, z1) as above, (t·x1, t·y1, t·z1) are identified as the X2-Y2-Z2 coordinate values of the position in the virtual space 32 that corresponds to the position of the real camera 24. The position in the virtual space 32 that corresponds to the position of the real camera 24 in the real space 22 identified as above will hereinafter be referred to as "corresponding camera position of the real camera 24."

The point 36 in the virtual space 32 that corresponds to a point on the surface of the object 20 to be shot correlated with a pixel including in the shot image shot by the real camera 24 is thereafter identified. The point 36 identified as above will hereinafter be referred to as "visible point of the real camera 24."

Ray-casting is thereafter executed from the corresponding camera position of the real camera 24 to each of the points 36 for each of which the value of the point density correlated thereto is greater than a predetermined value, of the visible points of the real camera 24.

The polygons 34 intersecting with the rays of the ray-casting are deleted from the polygon model. For example, it is assumed that, when the ray-casting is executed from a corresponding camera position P1 of the real camera 24 to a point 36c that is a visible point of the real camera 24 depicted in FIG. 9, a ray of the ray-casting and a polygon 34c intersect with each other at a position P2. In other words, it is assumed that the polygon 34c is identified as the polygon 34 that intersects with a line whose both ends are the corresponding camera position P1 and the position of the point 36c. In this case, the polygon 34c is deleted from the polygon model. In other words, the polygon data corresponding to the polygon 34c is deleted from the polygon model data.

According to the intersectional polygon deletion process described above, the polygons 34 unable to be deleted in the long-side polygon deletion process can be deleted and the polygon model after the intersectional polygon deletion process is executed therefor is brought closer to the polygon model whose surface is set along the contour of the group of points.

The polygons 34 on the side more internal than the outer surface of the polygon model may however remain even when the tong side polygon deletion process and the intersectional polygon deletion process as above are executed. These polygons 34 do not contribute to the expression of the outer appearance of the polygon model. It can therefore be stated that the pieces of polygon data corresponding to these polygons 34 are useless in the polygon model data.

The present embodiment is therefore adapted to delete the polygons 34 on the side more internal than the outer surface of the polygon model by the invisible polygon deletion process described below and, as a result, to reduce any useless portion of the data size of the polygon model data. Concerning this, an example of the invisible polygon deletion process will be described with reference to FIG. 10 to FIG. 12B.

Figure 10:
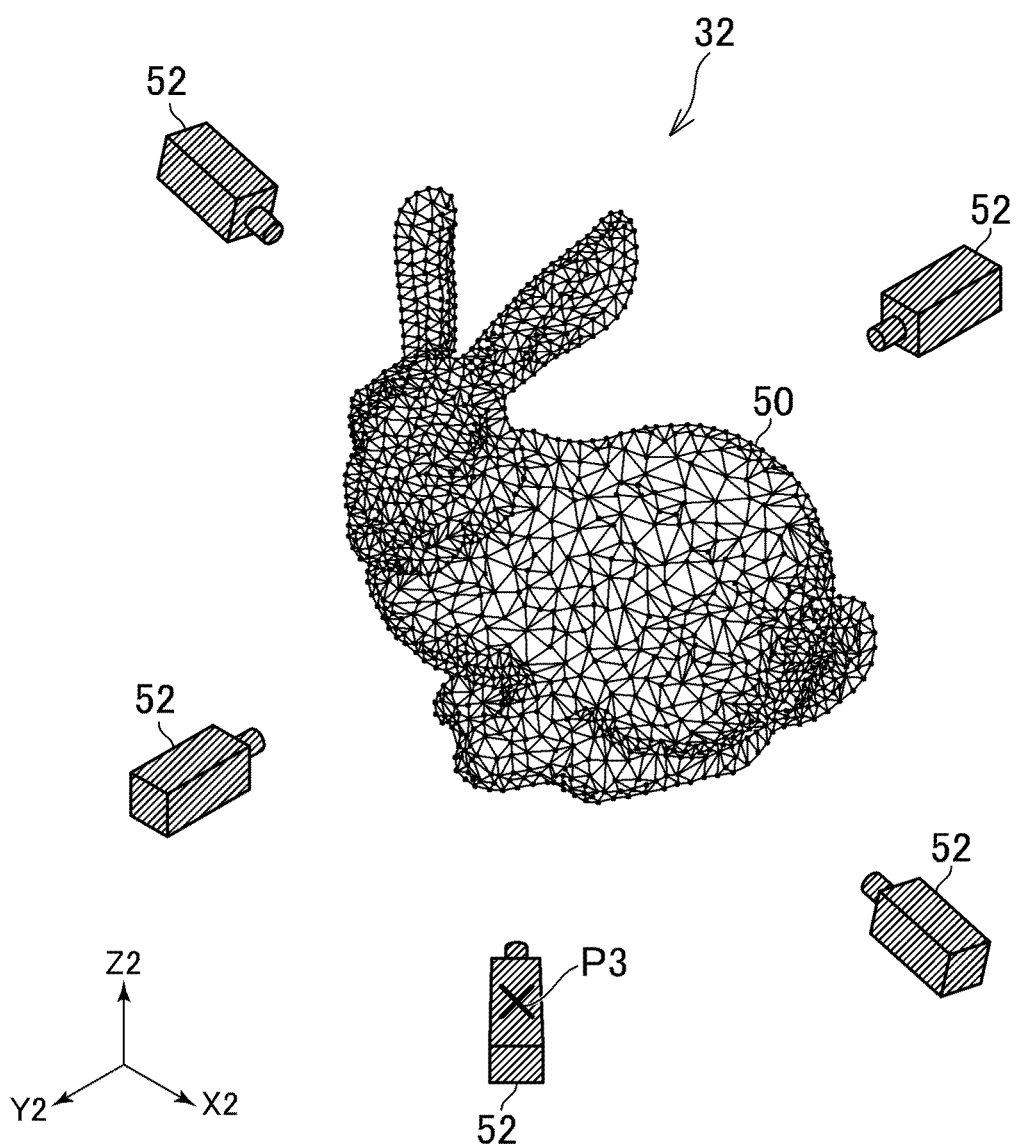
FIG. 10 is a diagram schematically depicting an example of the state where an intermediate polygon model is arranged in the virtual space.

As depicted in FIG. 10, the polygon model for which the long-side polygon deletion process and the intersectional polygon deletion process are already executed is arranged in the virtual space 32. The polygon model for which the lone side polygon deletion process and the intersectional polygon deletion process are already executed will hereinafter be referred to as "intermediate polygon model 50." The outer appearance of the intermediate polygon model 50 is same as that of the final polygon model 30 while the intermediate polygon model 50 has the polygons 34 on the side more internal than the outer surface remaining thereon as above. Concerning this, the polygons 34 included in the intermediate polygon model 50 may be arranged in the virtual space 32 in the state where these polygons 34 can each be distinguished from each other. For example, visible attributes such as the texture and the color to be correlated with the polygon ID of each of the polygons 34 may be set for the polygon 34.

Figure 11:
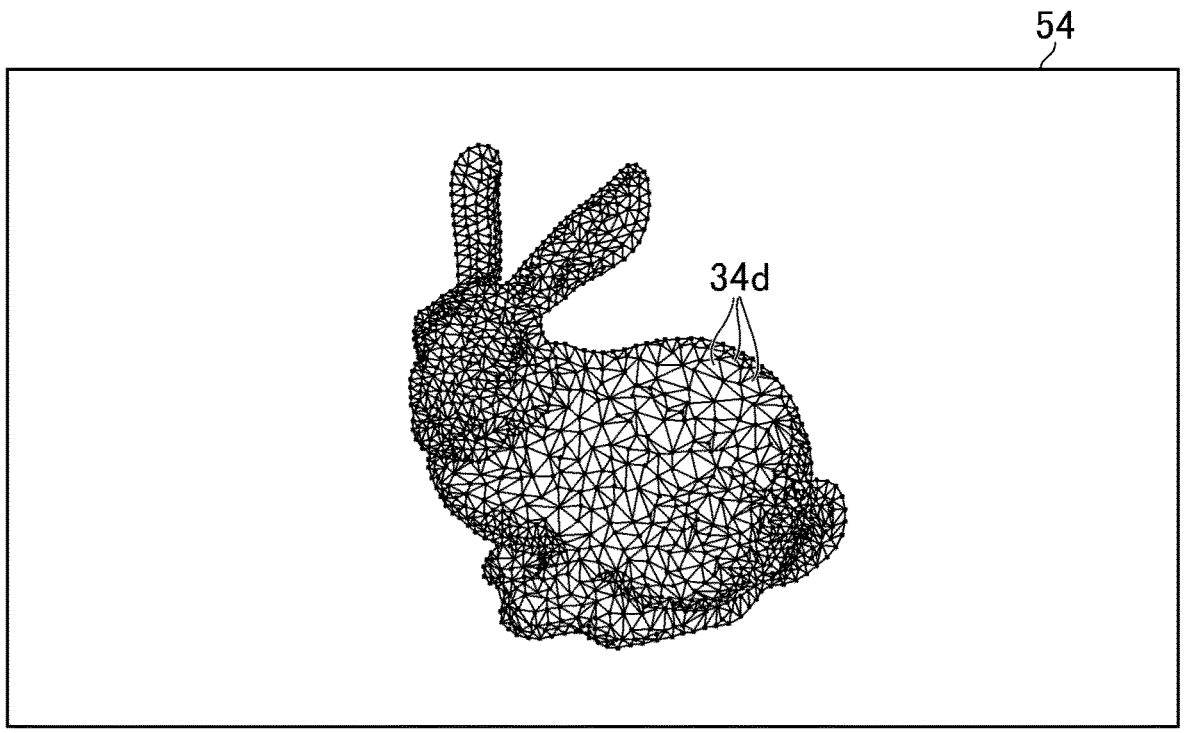
FIG. 11 is a diagram depicting an example of a virtual space image.

A virtual space image 54 exemplified in FIG. 11 is thereafter rendered, that shows the state where viewing is executed from virtual cameras 52 arranged at positions in the virtual space 32 to view therefrom the intermediate polygon model 50, toward the intermediate polygon model 50. FIG. 11 depicts the virtual space image 54 that shows the state where viewing is executed from the virtual camera 52 arranged at a position P3 in FIG. 10 toward the intermediate polygon model 50. Concerning this, the visible attributes set for the polygon 34 may be reflected on the virtual space image. The polygon 34 visible from the position from which the virtual space image 54 is shot (a visible polygon 34d) is identified. Concerning this, for example, the polygon 34 corresponding to the polygon ID correlated with the visible attributes set for the polygon 34 whose image is included in the virtual space image 54 may be identified as the visible polygon 34d.

Concerning the above, as depicted in FIG. 10, for each of the plural positions in the virtual space 32, the arrangement of the virtual camera 52, the generation of the virtual space image 54, and the identification of the visible polygon 34d that are described above may sequentially be executed. Moreover, the arrangement of the virtual camera 52, the generation of the virtual space image 54, and the identification of the visible polygon 34d may be executed in parallel processing at each of the plural positions in the virtual space 32. The polygon 34 not identified as the visible polygon 34d in any of the virtual space images 54 is thereafter identified as an invisible polygon.

Concerning the above, for example, a visible polygon ID list that is empty in the initial state may be adapted to have the polygon ID of the polygon 34 identified as the visible polygon 34d added thereto. The polygon 34 whose, polygon ID is not included in the visible polygon ID list may thereafter be identified as an invisible polygon.

The polygon 34 identified as the invisible polygon is thereafter deleted from the intermediate polygon model 50. In other words, the polygon data corresponding to the invisible polygon is deleted from the polygon model data.

Moreover, in the present embodiment, in the invisible polygon deletion process, a normal line direction correction process is executed for the polygon 34 identified as the visible polygon 34d in each of the virtual space, images 54.

Figure 12A:
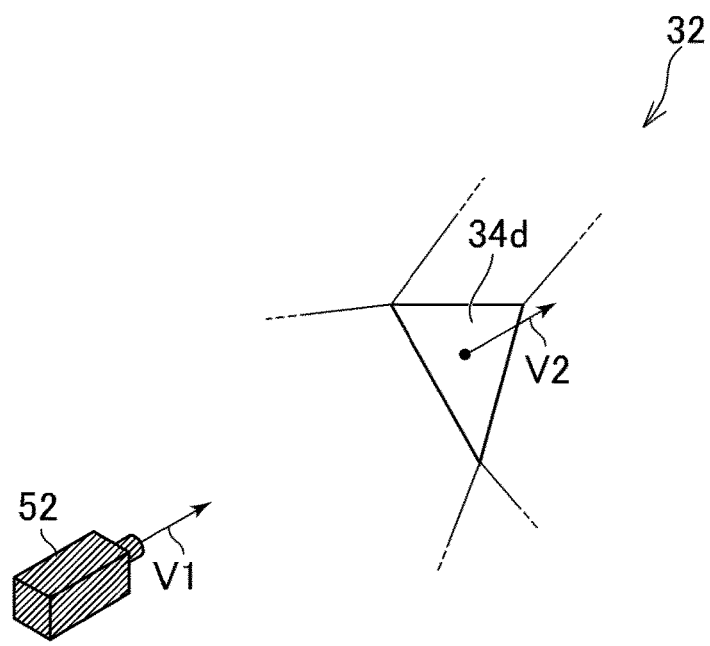
FIG. 12A is an explanatory diagram explaining an example of a normal line direction correction process.

In this case, for example, as depicted in FIG. 12A, in the case where, the normal line direction of the visible polygon 34d is not directed to the virtual camera 52, a normal line inversion count value correlated with the visible polygon 34d is increased by one. In other words, in the case where the inner product of a vector V1 in the direction of the shooting by the virtual camera 52 and a vector V2 in the normal line direction of the visible polygon 34d is positive, the normal line in out value correlated with the visible polygon 34d is increased by one.

Figure 12B:
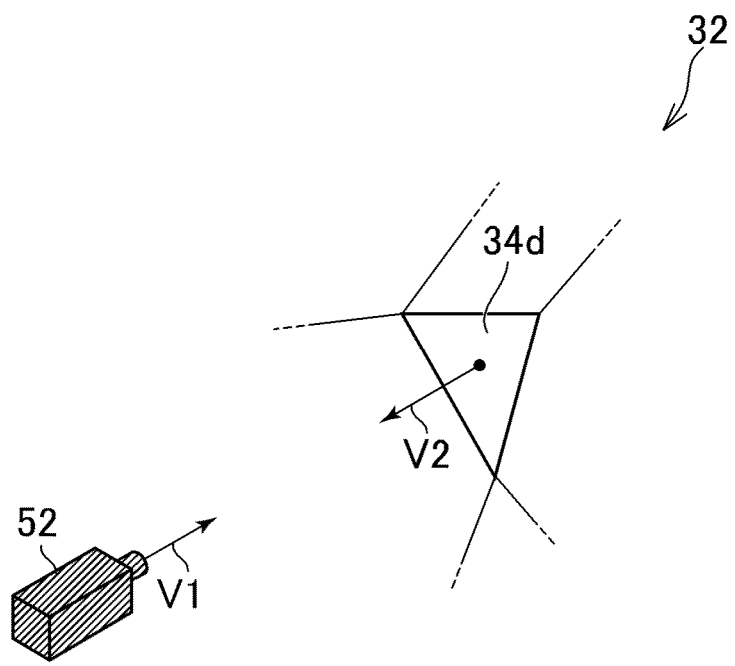
FIG. 12B is an explanatory diagram explaining an example of the normal line direction correction process.

In contrast, for example, as depicted in FIG. 12B, in the case where the normal line direction of the visible polygon 34d is directed to the virtual camera 52, the normal line inversion count value correlated with the visible polygon 34d is reduced by one. In other words, in the case where the inner product of the vector V1 in the direction of the shooting by the virtual camera 52 and the vector V2 in the normal line direction of the visible polygon 34d is negative, the normal line inversion count value correlated with the visible, polygon 34d is reduced by one. For this, it is assumed that the initial value of the normal line, inversion count value correlated with the visible polygon 34d is zero.

As a result of the increasing or reducing of the normal line inversion count value for each of all the virtual space images, the visible polygon 34d whose normal line in count value correlated thereto is positive is thereafter identified. The normal line direction indicated by the polygon data correlated with the identified visible polygon 34d is thereafter inverted. In this case, for example, the order of the second point ID and the third point ID is transposed, of the three point IDs included in the vertex data of the polygon data.

As a result of sequentially deleting the polygons 34 constituting the initial polygon model 40 depicted in FIG. 6, a polygon 34 whose normal line direction is not directed from the inner side toward the outer side of the outer surface, of the polygon model may be present. For the polygon 34, the normal line direction thereof is also corrected to be directed from the inner side toward the outer side of the outer surface, of the polygon 34 by the normal line direction correction process described above.

The final polygon model 30 exemplified in FIG. 3 is thereafter generated by the execution of the invisible polygon deletion process and the normal line direction correction process as above.

When the rendering function of the CPU is used, the virtual space image 54 can be easily generated. In the present embodiment, the visible polygon 34d is thereafter identified on the basis of the virtual space image 54 capable of being easily generated as above and the invisible polygon can therefore be easily identified.

As described above, in the present embodiment, the highly precise final polygon model 30 copying the object 20 to be shot can be generated with a low processing load by the simple process of deleting the polygons 34 from the initial polygon model 40 exemplified in FIG. 5.

The functions of the polygon model generating apparatus 10 according to the present embodiment and the processes executed by the polygon model generating apparatus 10 will further described below.

Figure 13:
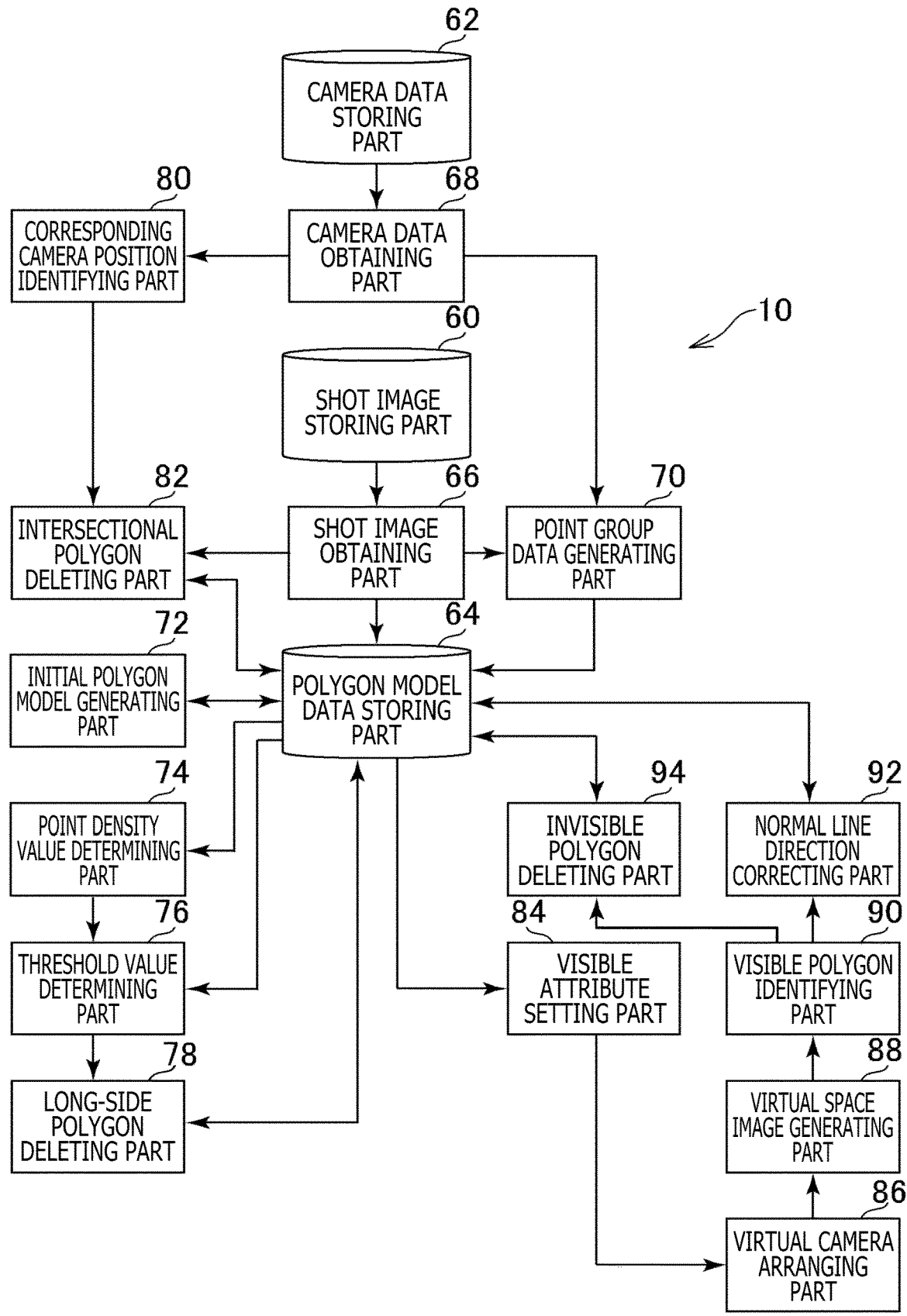
FIG. 13 is a functional block diagram depicting an example of the functions implemented in a polygon model generating apparatus according to an embodiment of the present invention.

FIG. 13 is a functional block diagram depicting an example of the functions implemented in the polygon model generating apparatus 10 according to the present embodiment. As depicted in FIG. 13, the polygon model generating apparatus 10 includes as its functions, for example, shot image storing part 60, a camera data storing part 62, a polygon model data storing part 64, a shot image obtaining part 66, a camera data obtaining part 68, a point group data generating part 70, an initial polygon model generating part 72, a point density value determining part 74, a threshold value determining part 76, a long-side polygon deleting part 78, a corresponding camera position identifying part 80, an intersectional polygon deleting part 82, a visible attribute setting part 84, a virtual camera arranging part 86, a virtual space image generating part 88, a visible polygon identifying part 90, a normal direction correcting part 92, and an invisible polygon deleting part 94.

The shot image storing part 60, the camera data storing part 62, and the polygon model data storing part 64 are implemented mainly in the storing part 14. The shot image obtaining part 66, the camera data obtaining part 68, the point group data generating part 70, the initial polygon model generating part 72, the point density value determining part 74, the threshold value determining part 76, the long-side polygon deleting part 78, the corresponding camera position identifying part 80, the intersectional polygon deleting part 82, the visible attribute setting part 84, the virtual camera arranging part 86, the virtual space image generating part 88, the visible polygon identifying part 90, thermal line direction correcting part 92, and the invisible polygon deleting part 94 are implemented mainly in the processor 12.

The above functions may also be implemented by execution by the processor 12 of a program installed in the polygon model generating apparatus 10 that is a computer, and including orders that correspond to the above functions. This program may be supplied to the polygon model generating apparatus 10 through a computer-readable information storage medium such as, for example, an optical disc, a magnetic disc, a magnetic tape, a magnetooptical disc, or a flash memory, or through the Internet or the like.

In the present embodiment, for example, the shot image storing part 60 stores therein the one or plural shot images obtained by shooting the object 20 to be shot, by the real camera 24 in the real space 22. The shot image, storing part 60 may store therein a shot image that is correlated with the depth information such as a depth image.

In the present embodiment, for example, the camera data storing part 52 stores therein camera data that indicates the position, the orientation, the angle of view, and the like of the real camera 24 in the real space 22 at the time when the shot image is shot. In the case where the shot image storing part 60 stores therein plural shot images, the camera data storing part 62 stores therein plural pieces of camera data that are correlated with the shot images.

In the present embodiment, for example, the polygon model data storing part 64 stoles therein the point group data that includes plural pieces of point data exemplified in FIG. 5, and the polygon model data that includes the plural pieces of polygon data exemplified in FIG. 7.

In the present embodiment, for example, the shot image obtaining part 66 obtains the one or plural shot images stored in the shot image storing part 60.

In the present embodiment, for example, the camera data obtaining part 68 obtains the one or plural pieces of camera data stored in the camera data storing part 62.

In the present embodiment, for example, the point group data generating part 70 generates the point group data on the basis of the shot images Obtained by the shot image obtaining part 66 and the camera data obtained by the camera data obtaining part 68, and causes the polygon model data storing part 64 to store therein the generated point group data.

In the present embodiment, for example, the initial polygon model generating part 72 generates the initial polygon model 40 that includes the plural polygons 34, on the basis of the point group data stored in the polygon model data storing part 64. In this case, for example, the initial polygon model 40 may be generated that includes the plural polygons 34 each having vertexes that are points 36 that belong to the group of points indicated by the point group data stored in the polygon model data storing part 64. In the present embodiment, for example, the initial polygon model generating part 72 thereafter cause the polygon model data storing part 64 to store therein the generated initial polygon model 40.

In the present embodiment, for example, the point density value determining part 74 determines the value of the point density correlated with each of the points 36 that belong to the group of points as above, on the basis of the distribution of the group of points indicated by the point group data stored in the polygon model data storing part 64.

In the present embodiment, for example, for each of the polygons 34 indicated by the polygon data stored in the polygon model data storing part 64, the threshold value determining part 76 determines the threshold value correlated with the side 42 that constitutes the polygon 34 as above. In this case, the threshold value determining part 76 may be adapted to determine a smaller value as the threshold value correlated with the value of the point density as the value of the point density is greater. The threshold value determining part 76 may retain data that indicates the rule for the correlation between the value of the point density and the threshold value. The threshold value determining part 76 may thereafter determine the threshold value using this data.

In the present embodiment, for example, in the case where the length of the side 42 constituting the polygon 34 exceeds the threshold value corresponding to the value of the point density correlated with the end point of the side 42, the long-side polygon deleting part 78 deletes the polygon 34 from the polygon model. In this case, the long-side polygon deleting part 78 may delete the polygon 34 that includes the side 42 whose length, is larger than the threshold value correlated thereto, from the polygon model as above. Moreover, the polygon data including the polygon ID of the polygon 34 that includes the side 42 whose length is larger than the threshold value correlated thereto may be deleted from the polygon model data.

In the present embodiment, for example, on the basis of the camera data obtained by the camera data obtaining part 68, the corresponding camera, position identifying part 80 identifies the corresponding camera position that is the position in the virtual space 32 corresponding to the position of the real camera 24 in the real space 22 indicated by the camera data.

In the present embodiment, for example the intersectional polygon deleting part 82 identifies the polygon 34 that intersects with the line whose, both ends are the position to view therefrom the polygon model in the virtual space 32 and the position of the point 36 that belongs to the group of points indicated by the point group data.

Concerning the above, the polygon 34 that intersects with a line whose, both ends are the corresponding camera position of the real camera 24 and the point 36 corresponding to the surface of the object 20 to be shot whose image is included in the shot image shot by the real camera 24 may be identified as above. Moreover, only each of at least some of the points 36 for which the value of the point density correlated thereto is larger than a predetermined value, the polygon 34 intersecting with the line whose both ends are the position of this point 36 and the position to view therefrom the polygon model in the virtual space 32 may be identified.

Moreover, for example, in the virtual space 32, the polygon 34 intersecting with a line whose both ends are the point of infinity for the center of the polygon model and the point 36 may be identified. Moreover, for example polygon 34 intersecting the line whose both ends are the position that is distant from the center of the polygon model by a predetermined number-fold (such as, for example, a 1.5-fold or a three-fold) distance or longer of the radius of the sphere including the polygon model and the point 36 may be identified.

Moreover, for example, the polygon 34 intersecting with the line whose both ends are the position to view therefrom the polygon model in the virtual space 32 set by the user and the point 36 may be identified.

In the present embodiment, for example, the intersectional polygon deleting part 82 thereafter deletes the identified polygon 34 from the polygon model. Concerning this, for example, the polygon data including the polygon ID of the identified polygon 34 may be deleted from the polygon model data.

In the present embodiment, for example, the visible attribute setting part 84 sets, in each of the polygons 34 constituting the intermediate polygon model 50 arranged in the virtual space 32, the visible attribute correlated with the polygon 34.

In the present embodiment, for example, the virtual camera arranging part 86 determines the position and the shooting direction of the virtual camera 52 in the virtual space 32. Concerning this, for example, the virtual camera arranging part 86 may vary the position and the orientation of the virtual camera 52 in accordance with the operation on the operation part 16 by the user. The virtual camera arranging part 86 may thereafter determine the arrangement of the virtual camera 52 in accordance with a determination operation by the user.

In the present embodiment, for example, the virtual space image generating part 88 generates the virtual space image 54 that shows the scene obtained by viewing from the position of the virtual camera 52 arranged by the virtual camera arranging part 86 in the shooting direction of the virtual camera 52. Concerning this, for example, plural virtual space images 54 showing the scenes obtained by viewing from the positions that differ from each other may be generated.

In the present embodiment, for example, the visible polygon identifying part 90 identifies the visible polygon 34d that is visible from the virtual camera 52 on the basis of the virtual space image 54.

In the present embodiment, for example, the normal line direction correcting part 92 executes the normal line direction correction process described above for each of the visible polygons 34d identified by the visible polygon identifying part 90.

In the present embodiment, for example, the invisible polygon deleting part 94 identifies the invisible polygons that are the invisible polygons 34 of the any of the one or plural virtual cameras 52 set in the virtual space 32. In the present embodiment, for example, the invisible polygon deleting part 94 thereafter deletes the identified invisible polygons from the polygon model. Concerning this, for example, the polygon data including the polygon ID of the invisible polygon may be deleted from the polygon model data. Moreover, the polygon data correlated with each of the polygons 34 that are not identified each as the visible polygon 34d in any of the virtual space images 54 may be deleted from the polygon model data.

Figure 14:
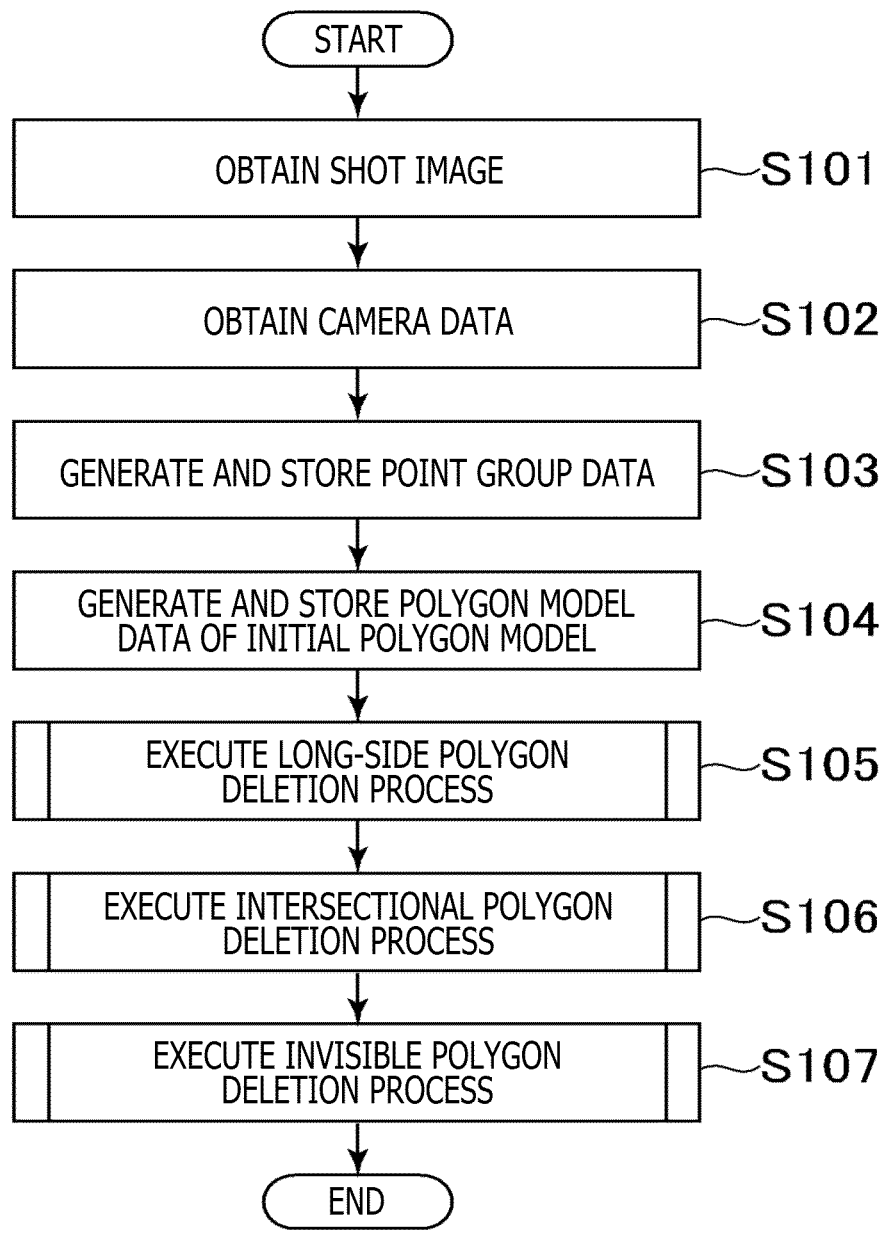
FIG. 14 is a flowchart depicting an example of the flow of processes executed by the polygon model generating apparatus according to an embodiment of the present invention.

Concerning the above, an example of the flow of the processes executed by the polygon model generating apparatus 10 according to the present embodiment will be described with reference to a flowchart exemplified in FIG. 14. In addition, in the following example of the processes, it is assumed that the visible polygon ID list that is empty when the processes are started is retained by the visible polygon identifying part 90.

The shot image obtaining part 66 first obtains the one or plural shot images stored in the shot image storing part 60 (S101). The camera data obtaining part 68 thereafter obtains the camera data correlated with the shot image obtained in the process denoted by S101 stored in the camera data storing part 62 (S102). In this example of the processes, it is as that the plural shot images are obtained in the process denoted by S101 and the plural pieces of camera data correlated respectively with the shot images in the process denoted by S102 are obtained.

The point group data generating part 70 thereafter generates the point group data that includes the plural pieces of point data and causes the polygon model data storing part 64 to store therein the generated point group data (S103). Concerning this, the point group data may be generated on the basis of the shot images obtained in the process denoted by S101. Otherwise, the point group data may be generated on the basis of the shot images obtained in the process denoted by S101 and the camera data obtained in the process denoted by S102.

The initial polygon model generating part 72 thereafter generates the polygon model data of the initial polygon model 40 on the basis of the point group data stored in the process denoted by S103, and causes the polygon model data storm part 64 to store therein the generated polygon model data (S104).

Such processes are thereafter executed as the long-side polygon deletion process (S105), the intersectional polygon deletion process (S106), and the invisible polygon deletion process (S107) in this order, and the polygon model data to be correlated with the final polygon model 30 is finally generated.

Figure 15:
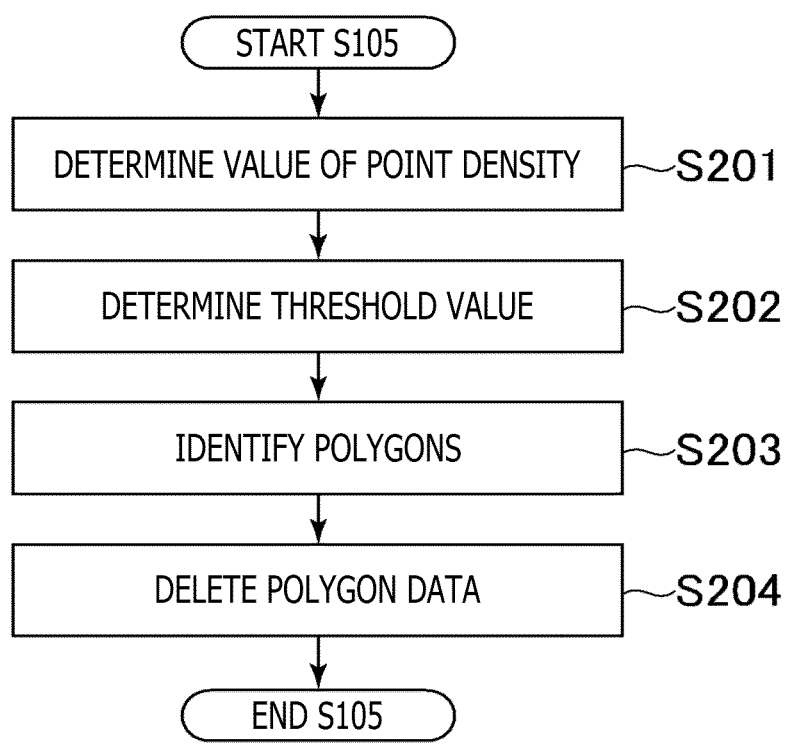
FIG. 15 is a flowchart depicting an example of the flow of processes executed by the polygon model generating apparatus according to an embodiment of the present invention.

An example of the flow of the long-side polygon deletion process executed by the polygon model generating apparatus 10 according to the present embodiment and denoted by S105 will be described below with reference to a flowchart exemplified in FIG. 15.

Based on the distribution of the group of points indicated by the point group data stored in the process denoted by S103, for each of the points 36 respectively corresponding to the plural pieces of point data included in the point group data, the point density value determining part 74 first determines the value of the point density that corresponds to this point 36 (S201).

For each of the plural pieces of poly on data included in the polygon model data generated in the process denoted by S104, the threshold value determining part 76 thereafter determines the threshold value that is correlated with the side 42 of the polygon 34 indicated by the polygon data (S202). Concerning this, for example, the side 42 corresponds to a combination of the points 36 that are respectively correlated with the two point IDs included in the vertex data of the polygon data. For the points 36 respectively correlated with these two point IDs, the threshold value correlated with the side 42 can be determined on the oasis of the value of the point density determined in the process denoted by S105.

The long-side polygon deleting part 78 thereafter identifies the polygon 34 that includes the side 42 for which the length of the side 42 exceeds the threshold value determined for the side 42, from the sides 42 for which the threshold value is determined in the process denoted by S202 (S320).

The long-side polygon deleting part 78 thereafter deletes the polygon data that includes the polygon ID of the polygon 34 identified in the process denoted by S203, from the polygon model data stored in the polygon model data storing part 64 (S204). The long-side polygon deletion process (S105) is thereafter caused to come to an end.

Figure 16:
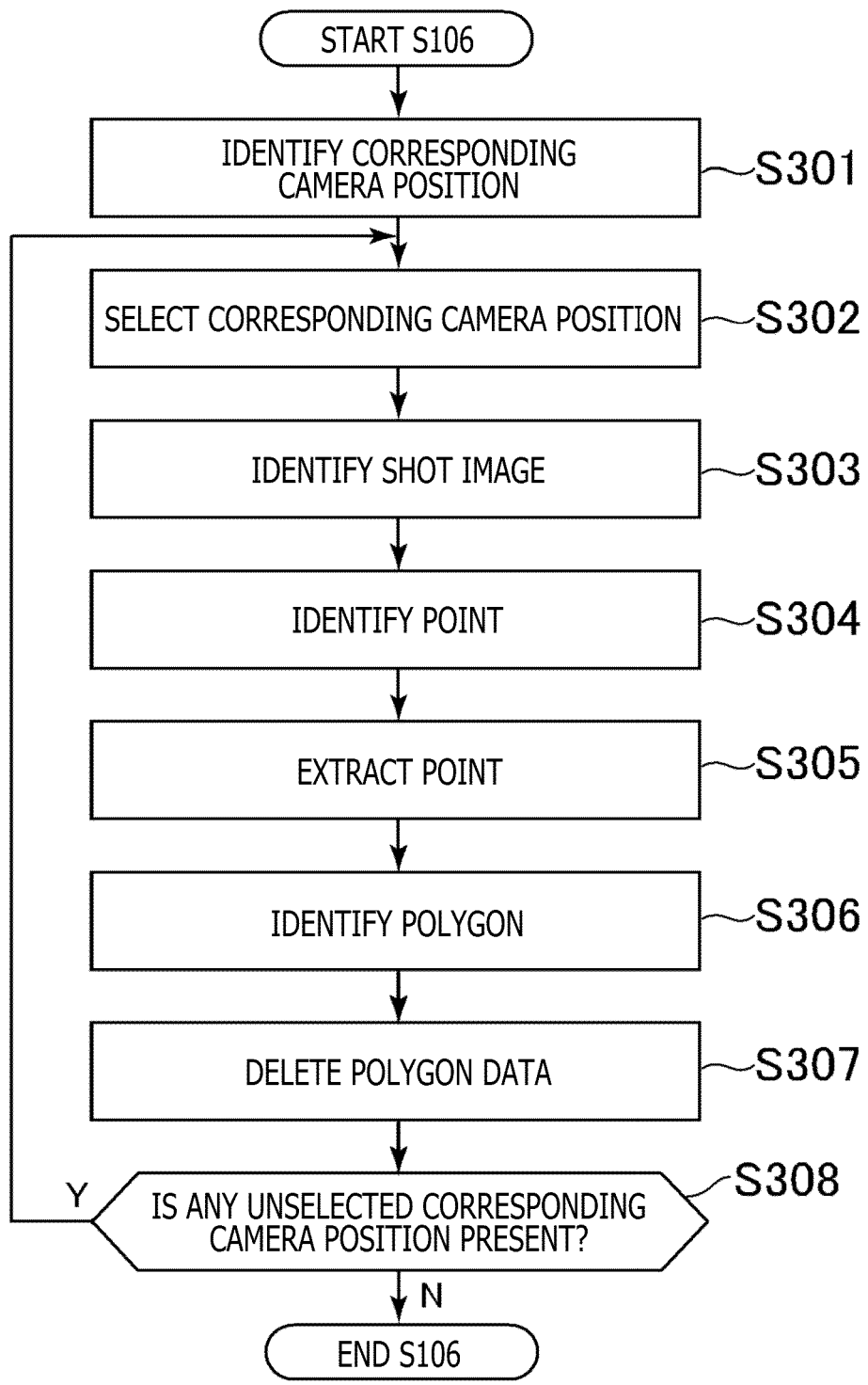
FIG. 16 is a flowchart depicting an example of the flow of processes executed by the polygon model generating apparatus according to an embodiment of the present invention.

An example of the flow of the intersectional polygon deletion process executed by the polygon model generating apparatus 10 according to the present embodiment and denoted by S106 will be described below with reference to a flowchart exemplified in FIG. 16.

The corresponding camera position identifying part 80 first identifies the corresponding camera positions of the real camera 24 respectively correlated with the pieces of camera data, based on the pieces of camera data obtained in the process denoted by S102 (S301). Because the plural pieces of camera data are obtained in this example of the process, the plural corresponding camera positions are identified.

The intersectional polygon deleting part 82 thereafter selects one corresponding camera position for which none of the processes denoted by S303 to S307 below is executed, from the corresponding camera positions identified in the process denoted by S301 (S302).

The intersectional polygon deleting part 82 thereafter identifies the shot image shot by the real camera 24 whose position corresponds to the corresponding camera position selected in the process denoted by S302 (S303).

The intersectional polygon deleting part 82 thereafter identifies the plural points 36 corresponding to the surface of the object 20 to be shot whose image is included in the shot image identified in the process denoted by S303 (S304).

The intersectional polygon deleting part 82 thereafter extracts the points 36 that are determined in the process denoted by S201 and for which the values of the point density correlated therewith are each greater than the predetermined value, from the plural point 36 identified in the process denoted by S304 (S305).

For each of the plural points 36 extracted in the process denoted by S305, the intersectional polygon deleting part 82 thereafter identifies the polygon 34 that intersects with the line whose both ends are the position of the point 36 and the corresponding camera position selected in the process denoted by S301 (S306).

The intersectional polygon deleting part 82 thereafter deletes the polygon data that includes the polygon ID of the polygon 34 identified in the process denoted by S306, from the polygon model data stored in the polygon model data storing part 64 (S307).

The intersectional polygon deleting part 82 thereafter checks whether any corresponding camera position that is not selected in the process denoted by S302 and for which none of the processes denoted by S303 to S307 is executed is present (S308). In the case where the intersectional polygon deleting part 82 determines that such a corresponding camera position is present (S308: Y), the flow returns to the process denoted by S302. In the case where the intersectional polygon deleting part 82 determines that no such corresponding camera position is present (S308: N), the intersectional polygon deletion process (S106) is caused to come to an end.

An example of the flow of the invisible polygon deletion process executed by the polygon model generating apparatus 10 according to the present embodiment and denoted by S107 will be described below with reference to a flowchart exemplified in FIG. 17.

The visible attribute setting part 84 first sets the visible attributes that differ from each other for each of the pieces of polygon data included in the polygon model data stored in the polygon model data storing part 64 (S401).

The virtual camera arranging part 86 thereafter determines the position of the virtual camera 52 to view the polygon model in the virtual space 32 and the shooting direction of the virtual camera 52 (S402). Concerning this, for example, the position and the shooting direct ion may randomly be determined, or the position and the shooting direction may be determined in accordance with the designation by the user.

The virtual space image generating part 88 thereafter generates the virtual space image 54 that shows the scene obtained by viewing from the position of the virtual camera 52 in the shooting direction of the virtual camera 52 (S403).

The visible polygon identifying part 90 thereafter identifies the visible polygons 34d that are visible from the virtual camera 52 on the basis of the virtual space image 54 generated in the process denoted by S403 (S404).

The visible polygon identifying part 90 thereafter adds the polygon Its of the visible polygons 34d identified in the process denoted by S404 to the visible polygon ID list (S405). In addition, in this example of the process, it is assumed that, when the polygon Its are added to the visible polygon ID list, the normal line inversion count value whose initial value is zero is correlated with each of the polygon IDs.

For each of the visible polygons 34d identified in the process denoted by S120, the normal line direction correcting part 92 thereafter calculates the value of the inner product of the vector V1 in the shooting direction of the virtual camera 52 and the vector V2 in the normal line direction of the visible polygon 34d (S406).

The normal line direction correcting part 92 thereafter updates the normal line inversion count value that is correlated with the polygon ID included in the visible polygon ID list, in accordance with the value of the inner product calculated in the process denoted by S405 (S407). Concerning this, for example, the normal line in count value correlated with the polygon ID of the visible polygon 34d whose calculated value of its inner product is positive is increased by one. Moreover, the normal line inversion count value correlated with the polygon ID of the visible polygon 34d whose calculated value of its inner product is negative is reduced by one.

The invisible, polygon deleting part 94 thereafter checks whether or not the processes denoted by S403 to S407 are repeatedly executed for the number of times determined in advance (S408). Concerning this, it is assumed that the invisible polygon deleting part 94 confirms that the processes are not yet repeatedly executed for the number of times determined in advance (S408: N). In this case, the virtual camera arranging part 86 varies the position of the virtual camera 52 to view the polygon model and the shooting direction of the virtual camera 52 in the virtual space 32 (S409) and the flow returns to the process denoted by S403. Concerning this, the posit ion and the shooting direction may randomly be varied or may be varied to the position and the shooting direction designated by the user.

It is assumed that, in the process denoted by S408, the invisible polygon deleting part 94 confirms that the processes are repeatedly executed for the number of times determined in advance (S408: Y). In this case, the normal line direction correcting part 92 identifies the polygon ID whose normal line inversion count value correlated thereto is positive, from the polygon IDs included in the visible polygon ID list retained by the visible polygon identifying part 90 (S410).

The normal line, direction correcting part 92 thereafter inverts the normal line direction indicated by the polygon data that includes the polygon ID identified in the process denoted by S409 stored in the polygon model data storing part 64 (S411). In the process denoted by S411, for example, the normal line direction correcting part 92 transposes the order of the second point ID and the third point ID of the three point IDs included in the vertex data of the polygon data that includes the polygon ID identified in the process denoted by S410.

The invisible polygon deleting part 94 thereafter identifies the invisible polygon on the basis of the visible polygon ID list retained by the visible polygon identifying part 90 and the polygon data stored in the polygon model data storing part 64 (S412).

The invisible polygon deleting part 94 thereafter deletes the polygon data that includes the polygon ID of the invisible polygon identified in the process denoted by S411, from the polygon model data stored in the polygon model data storing part 64 (S413). The invisible polygon deletion process (S107) is thereafter caused to come to an end.

Figure 17:
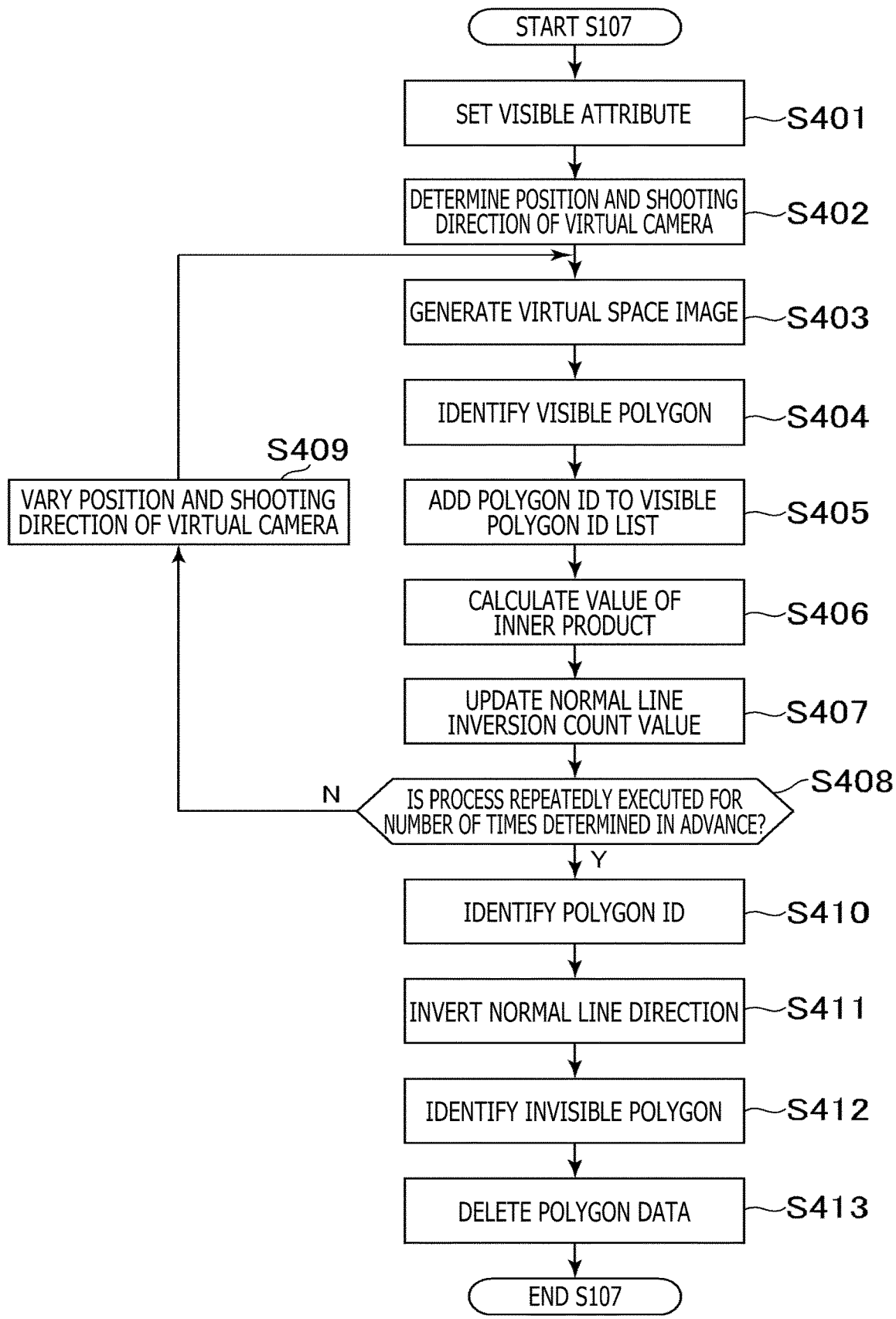
FIG. 17 is a flowchart depicting an example of the flow of processes executed by the polygon model generating apparatus according to an embodiment of the present invention.

In addition, in the example of the processes depicted in FIG. 17, the processes denoted by S406, S407, S410, and S411 correspond to the normal line direction correction process described above.

In the example of the processes described above, for example, the intersectional polygon deletion process denoted by S106 may be executed without executing the long-side polygon deletion process denoted by S105. Moreover, instead of the long-side polygon deletion process denoted by S105, a process of uniformly deleting the polygons 34 each including the side 42 that is longer than the predetermined length may be executed. Moreover, the long-side polygon deletion process denoted by S105 may be executed after executing the process of uniformly deleting the polygons 34 each including the side 92 that is longer than the predetermined length.

Moreover, the processes denoted by S306 and S307 may be executed for all the points 36 that are identified in the process denoted by S304 without executing the process, denoted by S305.

Moreover, the processes denoted by S403 to S409 described above are not executed as the processes to be repeated, and plural sets of the position of the virtual camera 52 and the shooting direction of the virtual camera 52 may be adapted to be determined in the process denoted by S402 and the processes denoted by S403 to S407 may thereafter be executed in parallel processing.

Moreover, the invisible polygon deletion process denoted by S107 may be executed for the polygon model for which the long-side, polygon deletion process denoted by S105 and the intersectional polygon deletion process denoted by S106 are not executed. Moreover, the invisible polygon deletion process denoted by S107 may not be executed after executing the intersectional polygon deletion process denoted by S106.

In addition, the present invention is not limited to the above embodiment.

Moreover, the above specific character strings and the above specific values, and the specific character strings and the specific values in the drawings are exemplification and the present invention is not limited to these character strings and values.

The invention claimed is:

1. A polygon model generating apparatus comprising:
a polygon model generating part that generates a polygon model that includes plural polygons on a basis of point group data indicating a group of points in a virtual space;
a point density value determining part that determines a value of a point density correlated with a point belonging to the group of points on a basis of a distribution of the group of points; and
a long-side polygon deleting part that, in a case where a length of a side constituting the polygon exceeds a threshold value in accordance with the value of the point density correlated with an end point of the side, deletes the polygon from the polygon model.

2. The polygon model generating apparatus according to claim 1, further comprising:
an intersectional polygon identifying part that identifies an intersectional polygon that is the polygon intersecting with a line whose both ends are a first position to view therefrom the polygon model in the virtual space and a second position that is a position of a point belonging to the group of points; and
an intersectional polygon deleting part that deletes the intersectional polygon from the polygon model.

3. The polygon model generating apparatus according to claim 2, further comprising:
an image obtaining part that obtains an image obtained by shooting an object to be shot by a real camera in a real space;
a point group data generating part that generates the point group data for which points belonging thereto each correspond to a point on the object to be shot in the real space, on a basis of the image; and
a corresponding camera position identifying part that identifies a position in the virtual space, that corresponds to a position in the real space of the real camera at a time when the object to be shot is shot, wherein
the intersectional polygon identifying part identifies the intersectional polygon using a position identified in the corresponding camera position identification procedure, as the first position.

4. The polygon model generating apparatus according to claim 2, wherein,
for only each of at least some of points for which values of the point density correlated thereto are each greater than a predetermined value, the intersectional polygon identifying part identifies the intersectional polygon using a position of the point as the second position.

5. The polygon model generating apparatus according to claim 1, further comprising:
an invisible polygon identifying part that identifies an invisible polygon that is the polygon invisible to any of one or plural virtual cameras set in the virtual space; and
an invisible polygon deleting part that deletes the invisible polygon from the polygon model.

6. A polygon model generation method comprising:
generating a polygon model that includes plural polygons on a basis of point group data indicating a group of points in a virtual space;
determining a value of a point density correlated with a point belonging to the group of points on a basis of a distribution of the group of points; and, in a case where a length of a side constituting the polygon exceeds a threshold value in accordance with the value of the point density correlated with an end point of the side, deleting the polygon from the polygon model.

7. A non-transitory computer readable medium having stored thereon a program for a computer, comprising:
- by a polygon model generating part, generating a polygon model that includes plural polygons on a basis of point group data indicating a group of points in a virtual space;
- by a point density value determining part, determining a value of a point density correlated with a point belonging to the group of points on a basis of a distribution of the group of points; and
- by a long-side polygon deleting part, in a case where a length of a side constituting the polygon exceeds a threshold value in accordance with the value of the point density correlated with an end point of the side, deleting the polygon from the polygon model.

* * * * *